United States Patent
Van Niekerk et al.

(10) Patent No.: US 9,550,259 B2
(45) Date of Patent: Jan. 24, 2017

(54) METHOD FOR CONNECTING TWO COMPONENTS, AND COMPONENT CONNECTION

(71) Applicant: Bayerische Motoren Werke Aktiengesellschaft, Munich (DE)

(72) Inventors: Johann Van Niekerk, Munich (DE); Eva Vietze, Munich (DE); Erik Martin, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 6 days.

(21) Appl. No.: 14/516,057

(22) Filed: Oct. 16, 2014

(65) Prior Publication Data

US 2015/0033532 A1    Feb. 5, 2015

Related U.S. Application Data

(63) Continuation of application No. PCT/EP2013/054932, filed on Mar. 12, 2013.

(30) Foreign Application Priority Data

Apr. 26, 2012    (DE) .................. 10 2012 206 938

(51) Int. Cl.
  *B23P 19/04*    (2006.01)
  *F16B 5/06*    (2006.01)
  (Continued)

(52) U.S. Cl.
  CPC ............... *B23P 19/04* (2013.01); *B23Q 17/22* (2013.01); *B23Q 17/2414* (2013.01);
  (Continued)

(58) Field of Classification Search
  CPC ........... B23P 19/04; F16B 2/20; F16B 5/0642; F16B 11/006; B23Q 17/2428; B23Q 17/2414; B23Q 17/22
  See application file for complete search history.

(56) References Cited

U.S. PATENT DOCUMENTS

2013/0212858 A1* 8/2013 Herzinger ............. F16B 5/0642
29/428

FOREIGN PATENT DOCUMENTS

DE    32 32 926 A1    3/1984
DE    42 13 366 A1    10/1993
(Continued)

OTHER PUBLICATIONS

International Search Report (PCT/ISA/210) dated May 24, 2013, with English translation (Eight (8) pages).
(Continued)

*Primary Examiner* — Ryan J Walters
(74) *Attorney, Agent, or Firm* — Crowell & Moring LLP

(57) ABSTRACT

A method for connecting a first component to a second component having a through hole includes the following steps: bringing the two components against one another and positioning them relative to one another, detecting the spatial position of the hole by a position detection electronic unit, positioning a connecting element at a location within the hole as a function of the spatial position of the hole or as a function of position data determined by the position detection electronic unit, connecting the connecting element to the first component, with the result that the connecting element projects into or through the hole, and clipping onto the connecting element a clip element which holds the two components together.

10 Claims, 1 Drawing Sheet

(51) Int. Cl.
*F16B 11/00* (2006.01)
*B23Q 17/22* (2006.01)
*B23Q 17/24* (2006.01)
*F16B 2/20* (2006.01)

(52) U.S. Cl.
CPC ............ *B23Q 17/2428* (2013.01); *F16B 2/20* (2013.01); *F16B 5/0642* (2013.01); *F16B 11/006* (2013.01); *Y10T 29/4978* (2015.01); *Y10T 29/49769* (2015.01); *Y10T 403/471* (2015.01)

(56) References Cited

FOREIGN PATENT DOCUMENTS

| | | |
|---|---|---|
| DE | 10 2010 015 179 A1 | 12/2010 |
| DE | 10 2010 028 322 A1 | 11/2011 |
| DE | 10 2010 041 356 A1 | 3/2012 |
| DE | 10 2011 087 286 A1 | 2/2013 |
| FR | 2 761 626 A1 | 10/1998 |
| WO | WO 2011/134563 A1 | 11/2011 |

OTHER PUBLICATIONS

German language Office Action dated Oct. 31, 2012 (Five (5) pages).
Chinese Office Action issued in counterpart Chinese Application No. 201380006109.X dated Feb. 3, 2016 with English translation (11 pages).
English translation of Chinese Office Action issued in counterpart Chinese Application No. 201380006109.X dated Jun. 3, 2015 (Eight (8) pages).

\* cited by examiner

METHOD FOR CONNECTING TWO COMPONENTS, AND COMPONENT CONNECTION

CROSS REFERENCE TO RELATED APPLICATIONS

This application is a continuation of PCT International Application No. PCT/EP2013/054932, filed Mar. 12, 2013, which claims priority under 35 U.S.C. §119 from German Patent Application No. 10 2012 206 938.0, filed Apr. 26, 2014, the entire disclosures of which are herein expressly incorporated by reference.

This application contains subject matter related to U.S. application Ser. No. 14/516,086, entitled "Clip Element and Component Connection" filed on Oct. 16, 2014.

BACKGROUND AND SUMMARY OF THE INVENTION

The present invention relates to a method for connecting two components, as well as to a component connection.

The earlier German Patent Applications DE 10 2011 080 317 3 as well as DE 10 2012 203 217.7, which are not prior publications, are part of the relevant state of the art.

In the large scale production of vehicle bodies, a plurality of individual vehicle body parts as well as attachments, such as fixtures, etc., are largely assembled in an automated manner. In the case of a joining operation, two or more vehicle body parts are first positioned relative to one another by use of high-expenditure clamping and receiving techniques, and are subsequently connected with one another, for example, by welding, clinching or other joining methods.

It is an object of the invention to provide a method for connecting two components, which method can be implemented in a simple and cost-effective manner, is suitable for large-scale production and results in a high-strength component connection.

This and other objects are achieved by providing a method for connecting a first component with a second component having a through-hole as well as by a component connection so formed. The method includes the acts of: (a) bringing-together and positioning the two components relative to one another; (b) detecting a spatial position of the through-hole by way of an electronic position detection unit; (c) positioning a connection element at a point within the through-hole as a function of the spatial position of the hole or as a function of position data determined by the electronic position detection unit; (d) connecting the connection element with the first component, so that the connection element projects into the hole or through the hole; and (e) clipping a clip element holding together the two components onto the connection element.

It is the starting point of the invention to form-fittingly and/or frictionally mutually connect at least two (i.e. two or more) components to be connected with one another by way of a connection element projecting from a first one of the two components and a "clip element" clipped onto the connection element.

In a first method step, the two components are placed against one another or positioned relative to one another. It may be provided that the two components come in direct contact with one another, i.e. rest directly against one another. However, this does not necessarily have to be so. In principle, the two components could also be arranged to be spaced away from one another by use of one or more spacers, one or more components arranged in-between and/or an adhesive layer.

After the bringing-together and orienting of the two components, the position of a through-hole provided in the second component is determined by an electronic position detection unit. The term "position detection" applies very generally to data or information which describe the spatial position of the hole provided in the second component or relative to the first component or to other reference geometries.

Subsequently, the connection element is placed at a point within the hole as a function of the spatial position of the hole or as a function of position data determined by the electronic position detection unit. It may be provided that in this case the connection element comes in contact with the first component or, more precisely, with the side of the first component facing the second component. The connection element is preferably pressed against the first component.

It may be provided that the electronic position detection unit has an optoelectronics system or a camera system by which the spatial position of the hole is opto-electronically detected. In principle, the spatial position could also be detected purely electronically, mechanically, hydraulically or in a different manner.

After the positioning of the connection element, the latter is connected with the first component, so that it projects into the hole or through the hole and thereby through the second component. The connection element is preferably welded to the first component. Different welding methods, such as laser welding, resistance current welding, friction welding, etc. may be used.

In order to achieve a high joining precision, it is advantageous to connect the connection element with the first component only after the bringing-together and positioning of the two components relative to one another. Specifically, it can be ensured in this manner that the connection element is positioned precisely in the center with respect to the hole. A further advantage is the fact that two components can be positioned and oriented significantly more easily relative to one another, if, in this case, the connection element is not yet connected with the first component.

For a large scale production, it is advantageous for the connection element to be welded onto the first component by way of an electronically controlled welding device (for example, a welding robot).

After the connecting of the connection element with the first component, a clip element is clipped onto the connection element, which clip element holds the two components together. It may, for example, be provided that the clip element has a hat-type or mushroom-type head section, which reaches over the hole and thereby presses the second component in the direction of the first component.

The first component and the connection element may, for example, consist of metal. The first component and the connection element may, for example, be a steel or aluminum component. The second component may also be a metal component, such as a steel or aluminum component. As an alternative, the second component may also be a plastic component, particularly a component made of a fiber-reinforced plastic material. Particularly plastic components can be used which are reinforced by embedded carbon fibers, glass fibers, metal wires or the like.

The clip element may completely or partly consist of a plastic material. As an alternative, it may also consist of metal or another material, or of several materials (such as a metal element with plastic injected around it). It has to have sufficient elasticity so that it can be clipped onto the connection element and, after the clipping-on, be held thereon in a frictional and/or form-fitting manner. By means of the clip element, the at least two components are not only held or clamped together, but are also positioned relative to one another with a high dimensional stability.

In addition, the two components can be welded to one another, particularly after being clipped-together.

The above-mentioned hat-type and mushroom-type section of the clip element may have an elastic design. This has the advantage that the two components can be held on one another without play after the clipping-on of the clip element.

In the case of certain applications, particularly in the case of so-called mixed-construction connections, in which a metal component is connected with a plastic component, it may be an advantage to additionally glue the two components to one another. The two components may, for example, be glued to one another before the clipping-on of the clip element or already before the connecting of the connection element with the first component.

The clipping-on of the clip element may take place manually. However, preferably this process step will also be automated. For this purpose, the spatial position of the connection element is detected by an electronic position detection unit. As an alternative, by using the already determined present or known position data, an automated clipping-on of the clip element can take place by way of a robot system, in which case, the spatial position of the connection element should naturally also be taken into account.

The connection element may be a sphere, for example, a steel or aluminum sphere. The term "sphere" should be interpreted extremely broadly. It comprises not only connection elements with a spherical geometry in the strict mathematical sense but also partial spheres (spherical caps) or connection elements similar to spheres.

According to a further development of the invention, the connection element consist of two, three or several mutually connected spherical or sphere-like elements. In the case of two or more spherical or sphere-like elements, it may be provided that the latter are arranged in a row one behind another.

The clip element can be configured and clipped onto the connection element such that it reaches over and or around at least one spherical or sphere-like element of the connection element. The more spherical or sphere-like elements of the connection element are subjected to the reaching-over and/or reaching-around by the clip element, the higher the strength of the component connection tends to be.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
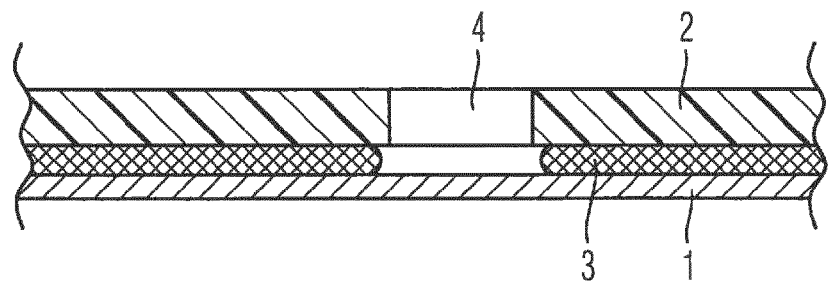
FIGS. 1 to 3 illustrate the individual steps which are implemented during the production method of a component connection according to an embodiment the invention.

FIG. 1 illustrates a first component 1 which may, for example, be a steel plate or sheet component. A second component 2, which may, for example, be a plastic component, particularly a fiber-reinforced plastic component, is applied to the first component 1. Especially plastic components which are reinforced by carbon fibers and/or glass fibers, can be used. Between the two components 1, 2, an adhesive layer 3 is inserted. The adhesive layer 3 glues the two components 1, 2 to one another. As illustrated in FIG. 1, the second component 2 has a through-hole 4.

After the bringing-together, positioning and gluing-together of the two components 1, 2, the spatial position of the hole 4 is determined by way of an electronic position detection unit or by way of a camera system, not shown here in detail but well-known to one of ordinary skill in the art. When the position of the hole 4 is known, a connection element 5 is positioned relative to the hole 4 by use of a positioning device (for example, a positioning robot). In the embodiment illustrated in FIG. 2, the connection element 5 consists of two mutually connected spherical elements 5a, 5b. In principle, the connection element 5 could be formed of several spherical elements arranged in a row one behind another. The spherical elements 5a-5c may, for example, consist of the same material as the first component 1, for example, of steel or aluminum. The spherical elements 5a-5c may be welded to one another or mutually connected with one another in a different manner. In principle, it is also contemplated that the connection element 5 is produced in one piece with its spherical elements 5a to 5c.

After the positioning of the connection element 5, the connection element 5 is connected with the first component 1. The connecting can take place, for example, by a welding-together. It may be provided that, for this purpose, the connection element 5 is pressed by the positioning device (not shown) against the first component 1, whereby a high weld quality is achieved.

Figure 2:
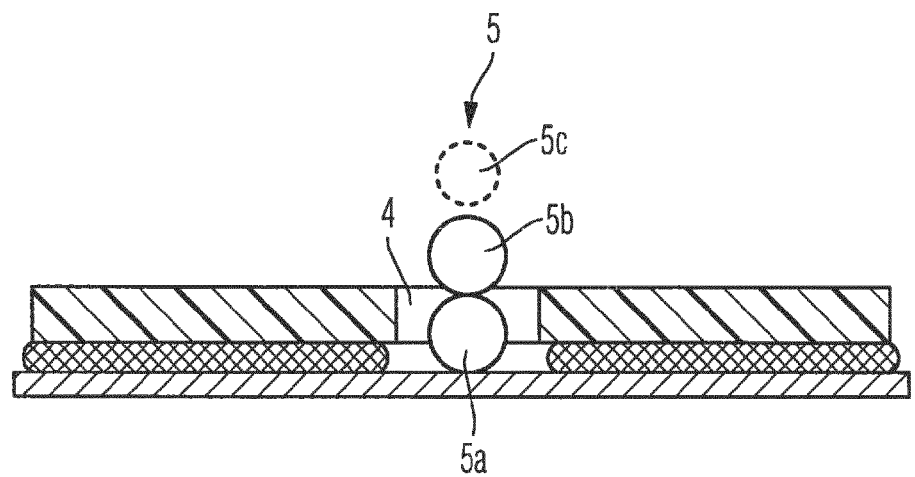

As illustrated in FIG. 2, after the connection with the first component 1, the connection element 5 projects into or through the hole 4.

Subsequently, a clip element 6 is clipped onto the connection element 5. The clip element 6 reaches over one of the spherical elements 5a to 5c, or over several of the spherical elements 5a to 5c as shown in FIG. 3.

Figure 3:
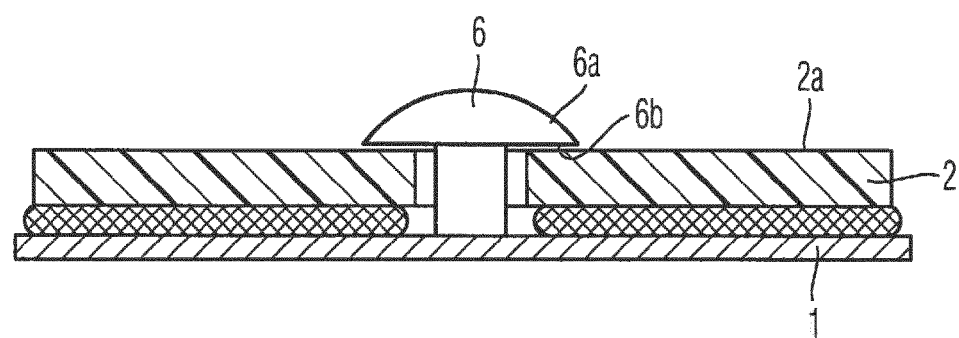

As illustrated in FIG. 3, the clip element 6 has an elastic clamping area 6a, which here has a convex shape like that of a hat or a mushroom head. It may be provided that, in contrast to what is shown in FIG. 3, an underside 6b of the elastic clamping area presses against a top side 2a of the second component 2. As a result of the elasticity of the clamping area 6a, it can be achieved that the two components 1, 2 are pressed together without play.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of connecting a first component with a second component, the second component having a through-hole, the method comprising the acts of:
   bringing the first and second components together and positioning the first and second components relative to one another;
   detecting a spatial position of the through-hole in the second component via an electronic position detection unit;
   positioning a connection element at a location within the through-hole as a function of the spatial position of the through-hole or as a function of position data determined via the electronic position detection unit;

connecting the connection element with the first component so that the connection element projects out of the through-hole; and clipping a clip element onto the connection element, the clip element holding together the first and second components, wherein the connection element consists of at least two spherical elements.

2. The method according to claim 1, wherein the electronic position detection unit comprises an opto-electronic system, the method further comprising the opto-electronic detection of the spatial position of the through-hole.

3. The method according to claim 2, further comprising the acts of:

detecting a spatial position of the connection element via an electronic position detection unit or by use of position data from the electronic position detection unit; and automatically clipping the clipping element onto the connection element via robotic control as a function of the spatial position of the connection element.

4. The method according to claim 1, further comprising the act of:

gluing the first and second components together prior to the connecting or clipping acts.

5. The method according to claim 4, further comprising the acts of:

detecting a spatial position of the connection element via an electronic position detection unit or by use of position data from the electronic position detection unit; and automatically clipping the clipping element onto the connection element via robotic control as a function of the spatial position of the connection element.

6. The method according to claim 1, wherein the act of connecting the connection element further comprises the act of welding the connection element onto the first component via an electronically controlled welding device.

7. The method according to claim 6, further comprising the acts of:

detecting a spatial position of the connection element via an electronic position detection unit or by use of position data from the electronic position detection unit; and automatically clipping the clipping element onto the connection element via robotic control as a function of the spatial position of the connection element.

8. The method according to claim 1, wherein the act of clipping the clipping element is carried out manually.

9. The method according to claim 1, further comprising the acts of:

detecting a spatial position of the connection element via an electronic position detection unit or by use of position data from the electronic position detection unit; and automatically clipping the clipping element onto the connection element via robotic control as a function of the spatial position of the connection element.

10. The method according to claim 1, wherein the two or more spherical elements includes a first spherical element is connected to the first component a second spherical element that is connected to the first spherical element.

* * * * *